(12) United States Patent
Mack

(10) Patent No.: US 12,538,894 B1
(45) Date of Patent: Feb. 3, 2026

(54) SELF-PROPELLED OVERHEAD LIVESTOCK ENCLOSURE WASHING SYSTEM

(71) Applicant: Jerome I. Mack, Leola, SD (US)

(72) Inventor: Jerome I. Mack, Leola, SD (US)

( * ) Notice: Subject to any disclaimer, the term of this patent is extended or adjusted under 35 U.S.C. 154(b) by 448 days.

(21) Appl. No.: 18/073,082

(22) Filed: Dec. 1, 2022

Related U.S. Application Data

(60) Provisional application No. 63/348,526, filed on Jun. 3, 2022.

(51) Int. Cl.
*B08B 3/02* (2006.01)
*A01K 1/01* (2006.01)
*B05B 13/04* (2006.01)
*B08B 13/00* (2006.01)

(52) U.S. Cl.
CPC ............ *A01K 1/01* (2013.01); *B05B 13/0426* (2013.01); *B08B 3/024* (2013.01); *B08B 13/00* (2013.01)

(58) Field of Classification Search
None
See application file for complete search history.

(56) References Cited

U.S. PATENT DOCUMENTS

| | | |
|---|---|---|
| 2,903,189 A | 9/1959 | Patton |
| 3,625,425 A | 12/1971 | Robinson |
| 3,715,774 A | 2/1973 | Fannon, Jr. |
| 4,074,856 A | 2/1978 | Williams |
| 4,304,194 A | 12/1981 | Boykin |
| 4,313,397 A | 2/1982 | Markum |
| 4,380,842 A | 4/1983 | Thomas |
| 4,782,551 A | 11/1988 | Balwebber |
| 4,805,648 A | 2/1989 | Hour |
| 4,911,188 A | 3/1990 | Seidel |
| 4,981,268 A | 1/1991 | Hour |
| RE33,746 E | 11/1991 | Lucas |
| 5,291,906 A * | 3/1994 | White ............... B60S 3/04 239/263.1 |
| 5,312,044 A | 5/1994 | Eaton |

(Continued)

OTHER PUBLICATIONS

Trailer Washer, Swine Robotics, Inc., web page, swinerobotics.com/site/trailerwasher/, 3 pages, download date May 2, 2022.

(Continued)

*Primary Examiner* — Cristi J Tate-Sims
(74) *Attorney, Agent, or Firm* — Jeffrey A. Proehl; Woods, Fuller, Shultz & Smith, PC

(57) ABSTRACT

An enclosure washing system for cleaning the interior of a livestock confinement building may include a guide track assembly for positioning in an elevated condition above the building floor, and a mobile unit movable along the track assembly. The mobile unit may include a frame and a movement mechanism to move the unit along the track assembly. The movement mechanism may include movement wheels rotatably mounted on the frame to engage the track assembly and a movement motor to rotate at least one movement wheel. The mobile unit may have a nozzle mechanism configured to disperse the cleaning fluid from the mobile unit into the interior space of the livestock confinement building. Elements of the nozzle mechanism may be rotatable to direct the cleaning fluid around the interior space of the livestock confinement building.

20 Claims, 8 Drawing Sheets

(56) References Cited

U.S. PATENT DOCUMENTS

| | | | |
|---|---|---|---|
| 5,326,037 A | | 7/1994 | Hour |
| 5,397,056 A | * | 3/1995 | Sakatani .............. A01G 25/095 |
| | | | 239/173 |
| 5,462,227 A | | 10/1995 | Ping |
| 5,594,973 A | | 1/1997 | Brusseleers |
| 5,613,511 A | | 3/1997 | Andersen |
| 5,740,821 A | | 4/1998 | Arnold |
| 5,833,147 A | | 11/1998 | Fuhlbrigge |
| 5,947,387 A | | 9/1999 | Zink |
| 6,085,994 A | | 7/2000 | Zink |
| 6,276,377 B1 | | 8/2001 | Hormann |
| 6,325,863 B1 | * | 12/2001 | Zamensky ................ B60S 3/04 |
| | | | 134/123 |
| 6,372,053 B1 | | 4/2002 | Belanger |
| 6,394,370 B1 | | 5/2002 | Payne |
| 6,565,668 B1 | | 5/2003 | Sandberg |
| 6,591,780 B2 | | 7/2003 | Fujii |
| 6,789,755 B1 | | 9/2004 | Mack |
| 6,810,832 B2 | | 11/2004 | Ford |
| 6,938,577 B2 | | 9/2005 | Kraft |
| 7,104,220 B1 | | 9/2006 | Mack |
| 2001/0038040 A1 | | 11/2001 | Peterson |
| 2002/0162576 A1 | | 11/2002 | Fratello |
| 2004/0144873 A1 | | 7/2004 | Johnston |
| 2008/0066790 A1 | * | 3/2008 | Rems ..................... B08B 13/00 |
| | | | 134/123 |
| 2010/0206333 A1 | * | 8/2010 | MacNeil ................ F22B 37/52 |
| | | | 134/18 |
| 2018/0208159 A1 | * | 7/2018 | Jensen ..................... B05B 3/02 |

OTHER PUBLICATIONS

EVO Cleaner, Swine Robotics, Inc., web page, swinerobotics.com/site/evo-cleaner/, 3 pages, download date May 2, 2022.

Wash Hand 2.0, Swine Robotics, Inc., web page, swinerobotics.com/site/wash-hand/, 4 pages, download date May 2, 2022.

Hurri Train, Swine Robotics, Inc., web page, swinerobotics.com/site/hurritrain/, 2 pages, download date May 2, 2022.

Flyer; ProCleaner XB100—Battery Driven; 2 pages; Washpower Inc., Melrose Park IL.

Flyer; ProCleaner XS100; 2 pages; Washpower Inc., Melrose Park IL.

* cited by examiner

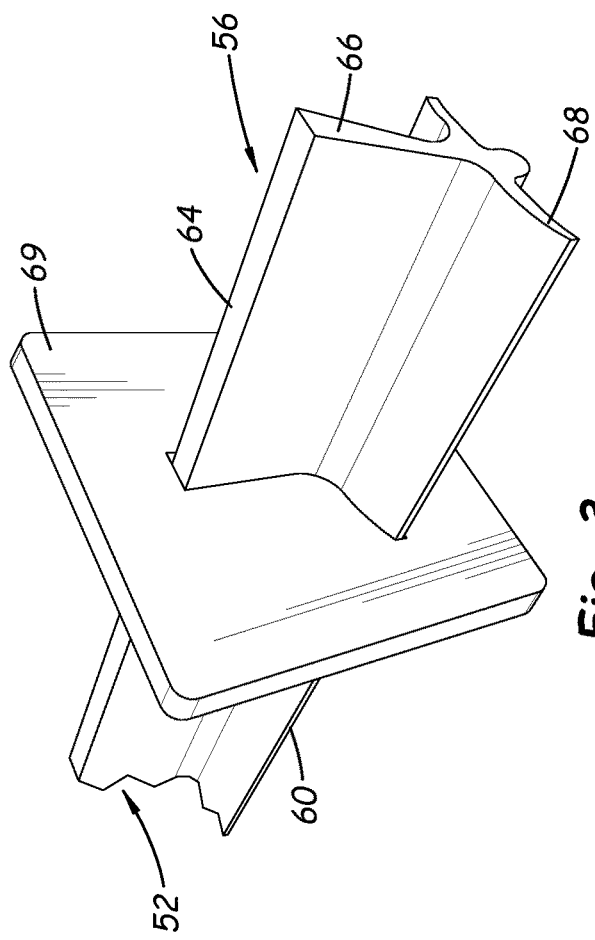
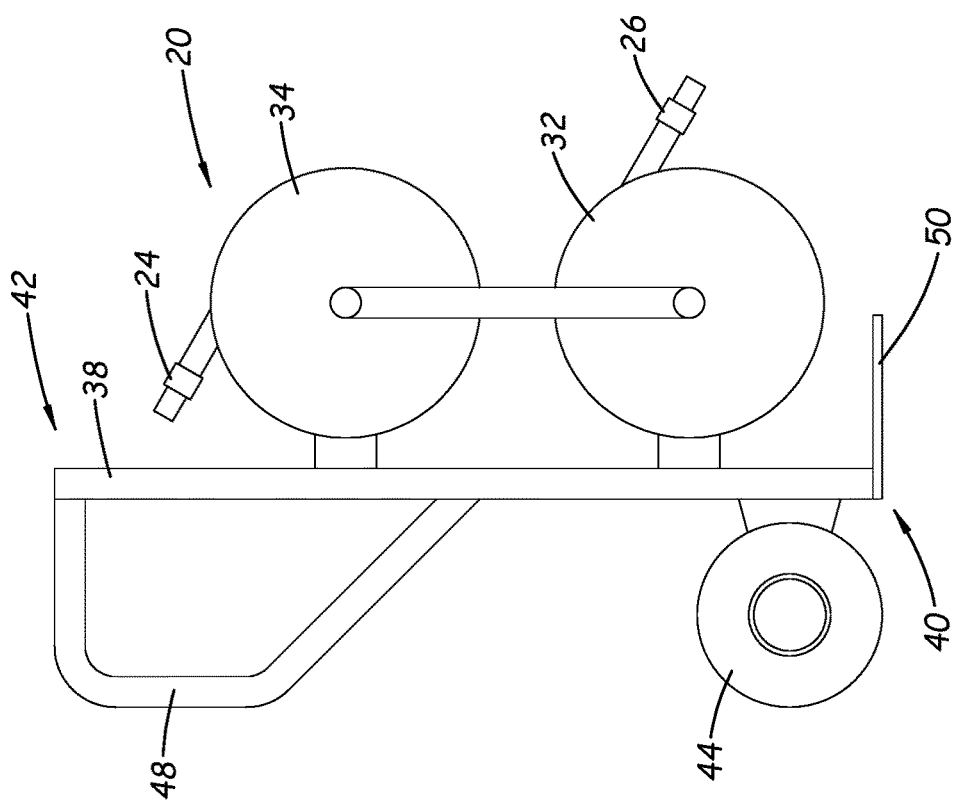

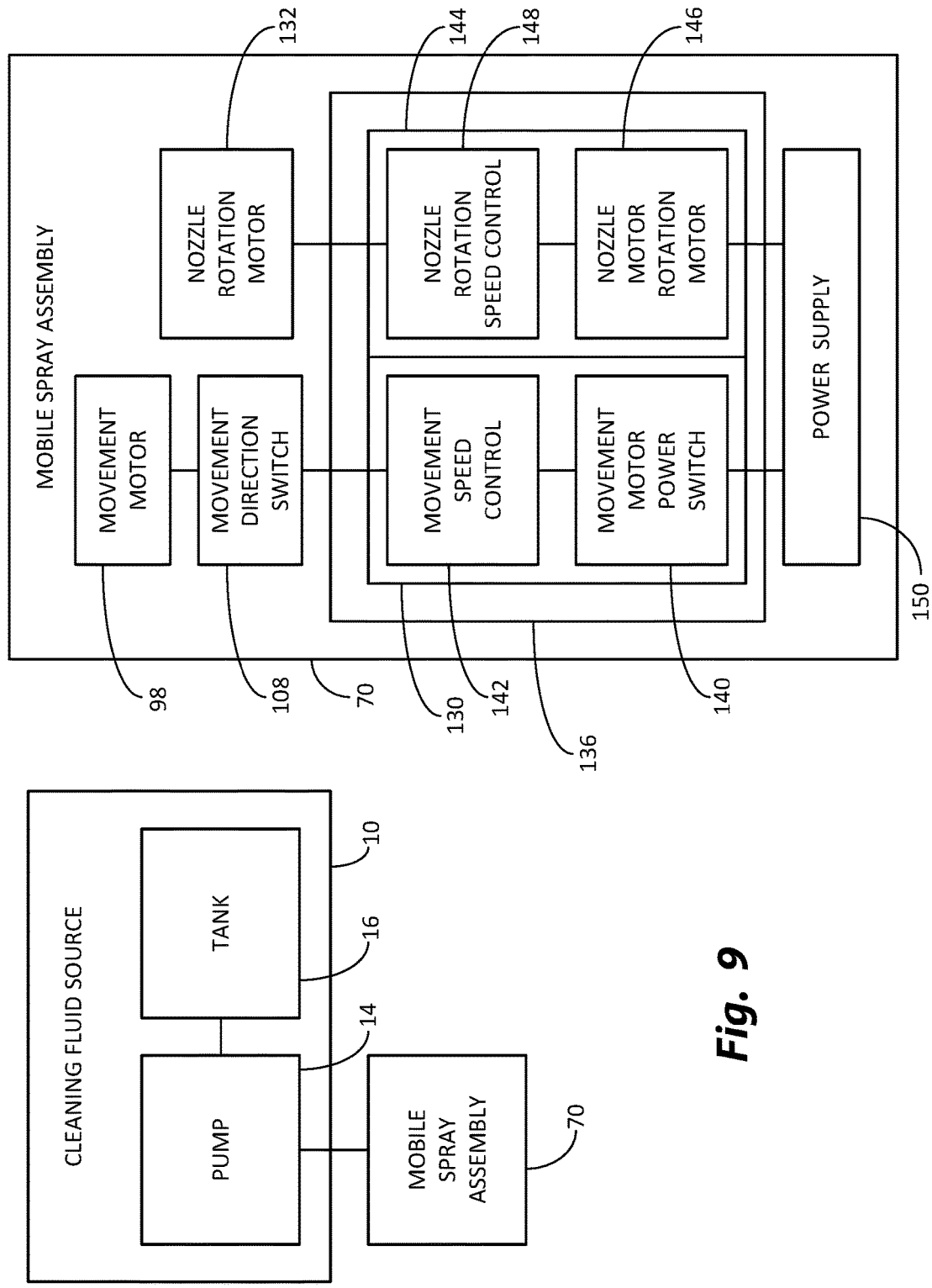

SELF-PROPELLED OVERHEAD LIVESTOCK ENCLOSURE WASHING SYSTEM

REFERENCE TO RELATED APPLICATIONS

This application claims the filing priority of U.S. Provisional Patent Application No. 63/348,526 filed Jun. 3, 2022, which is hereby incorporated by reference in its entirety.

BACKGROUND

Field

The present disclosure relates to cleaning apparatus and more particularly pertains to a new self-propelled overhead livestock enclosure washing system for facilitating the automated cleaning of waste from livestock living quarters.

SUMMARY

In one aspect, the present disclosure relates to an enclosure washing system for cleaning portions of an interior space of a livestock confinement building. The enclosure washing system may comprise a guide track assembly for positioning in an elevated condition above a floor of the livestock confinement building, and the guide track assembly may define a path. The system may also include a mobile unit engaging the guide track assembly such that the mobile unit is movable along the guide track assembly along the path. The mobile unit may comprise a frame and a movement mechanism configured to move the mobile unit along the guide track assembly. The movement mechanism may comprise a pair of movement wheels rotatably mounted on the frame and positioned to engage the track assembly such that rotation of at least one of the movement wheels causes the mobile spray assembly to move along the guide track assembly. The movement mechanism may also include a movement motor configured to rotate at least one movement wheel of the pair of movement wheels, and the movement motor being mounted on the frame. The mobile unit may also include a nozzle mechanism configured to disperse the cleaning fluid from the mobile unit into the interior space of the livestock confinement building. The nozzle mechanism may include a nozzle to dispense the cleaning fluid into the interior space, and elements of the nozzle mechanism being rotatable to direct the cleaning fluid around the interior space of the livestock confinement building.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 2 is a schematic side view of the fluid supply assembly of the system in a transport orientation, according to an illustrative embodiment.

FIG. 3 is a schematic perspective view of a portion of the guide track assembly showing an end track segment and a stop element of the system, according to an illustrative embodiment.

FIG. 9 is a schematic diagram of the cleaning fluid source of the system, according to an illustrative embodiment.

FIG. 10 is a schematic diagram of elements of the mobile unit of the system, according to an illustrative embodiment.

DETAILED DESCRIPTION

Figure 1:
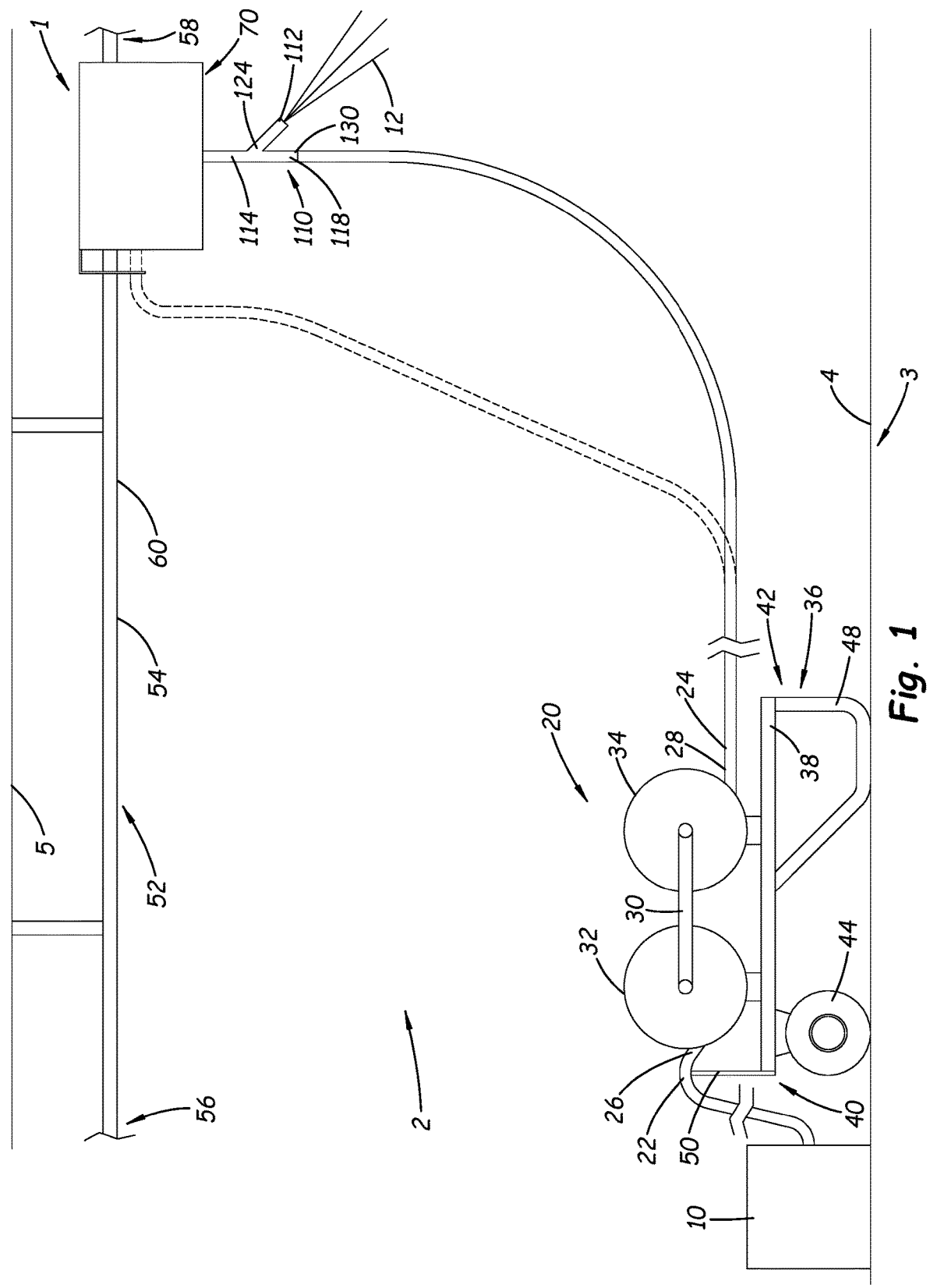
FIG. 1 is a schematic elevation view of aspects of a new self-propelled overhead livestock enclosure washing system, including the guide track assembly, the mobile spray assembly, and the fluid supply assembly (in a use orientation), and showing the XXX in broken lines according to the present disclosure.
Figure 4:
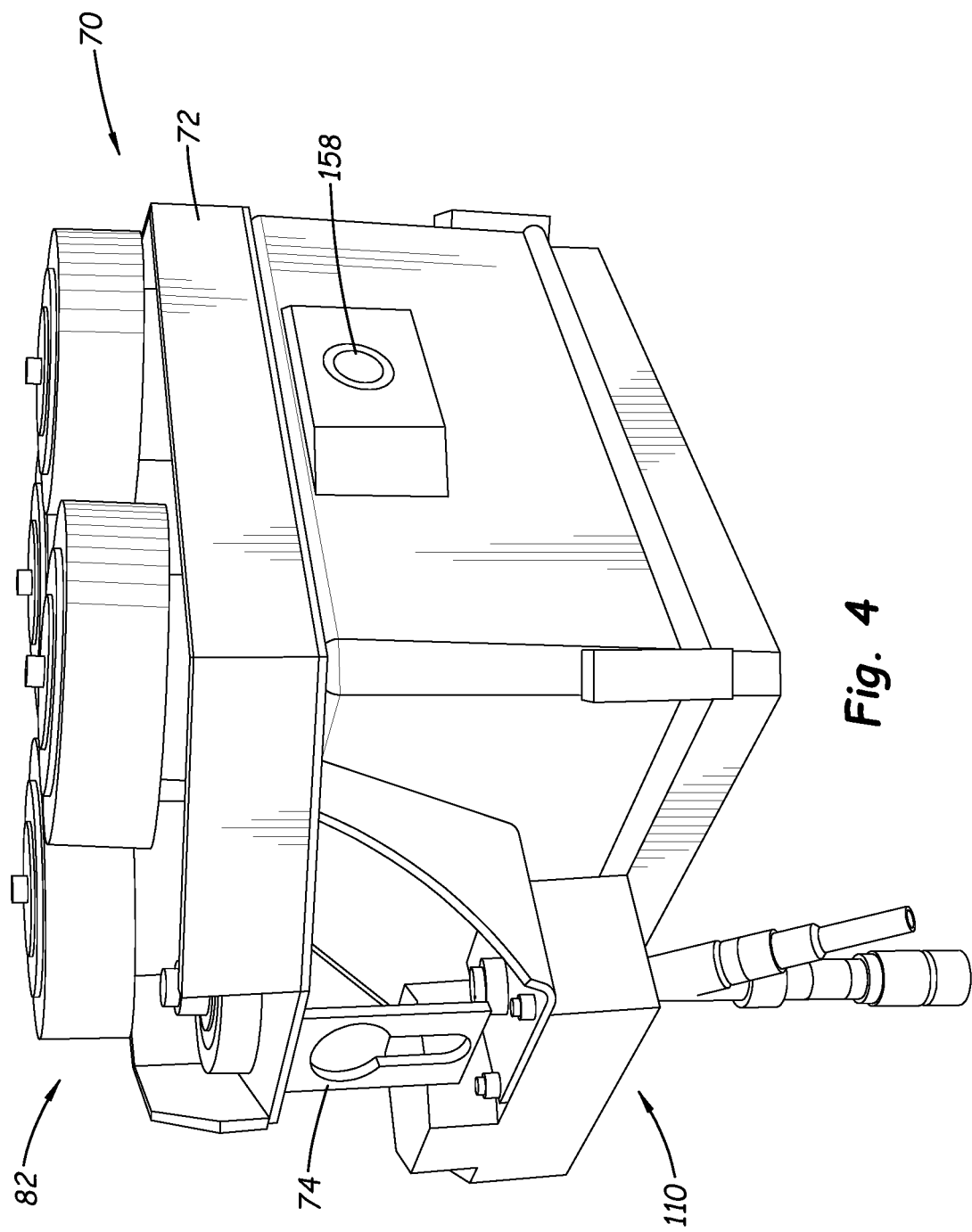
FIG. 4 is a schematic perspective view of the mobile spray assembly particularly showing aspects of the movement mechanism and the nozzle mechanism, according to an illustrative embodiment.
Figure 5:
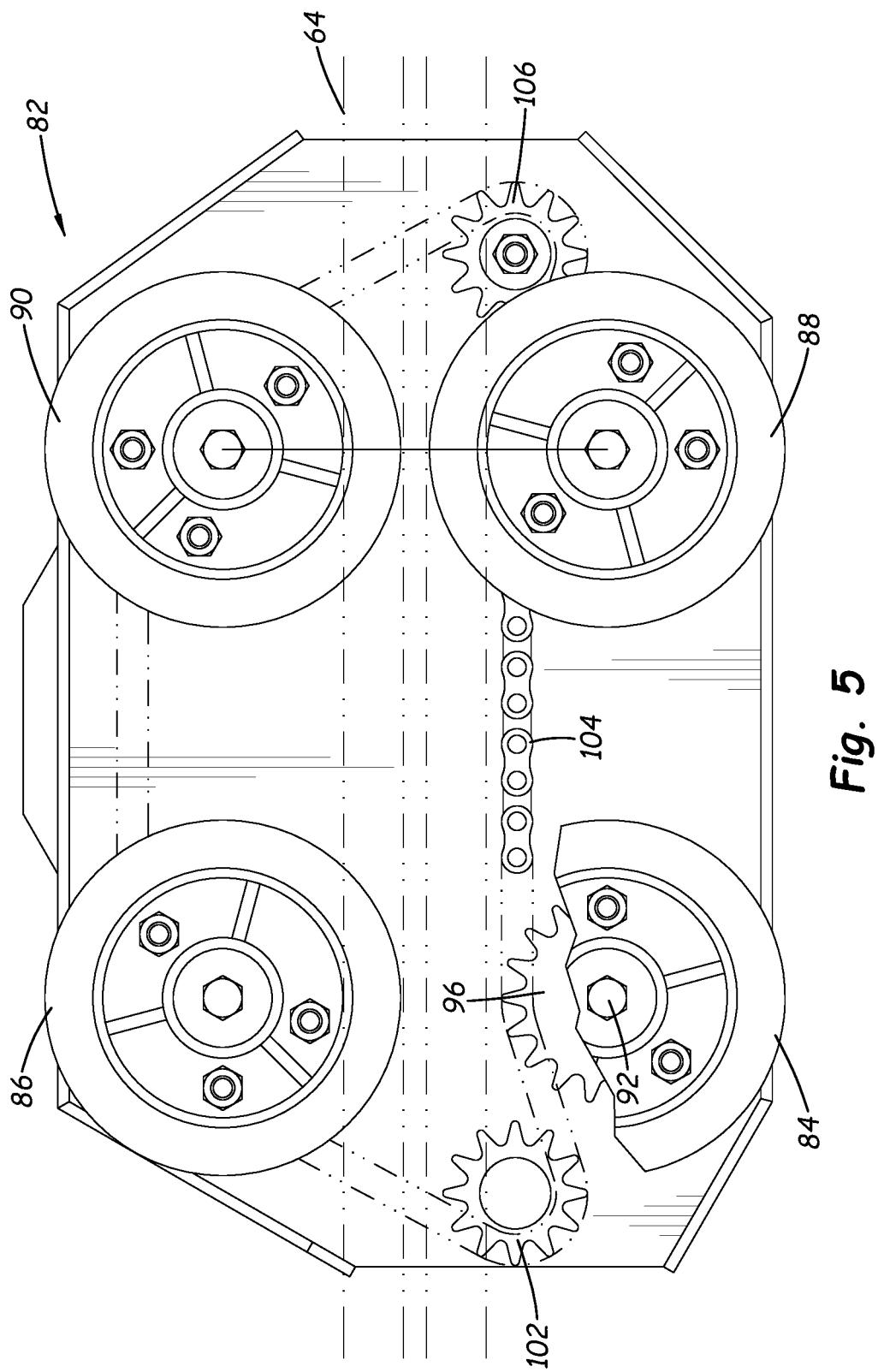
FIG. 5 is a schematic top view of the mobile spray assembly with a portion of a track segment shown in broken lines and particularly showing aspects of the movement mechanism, according to an illustrative embodiment.
Figure 6:
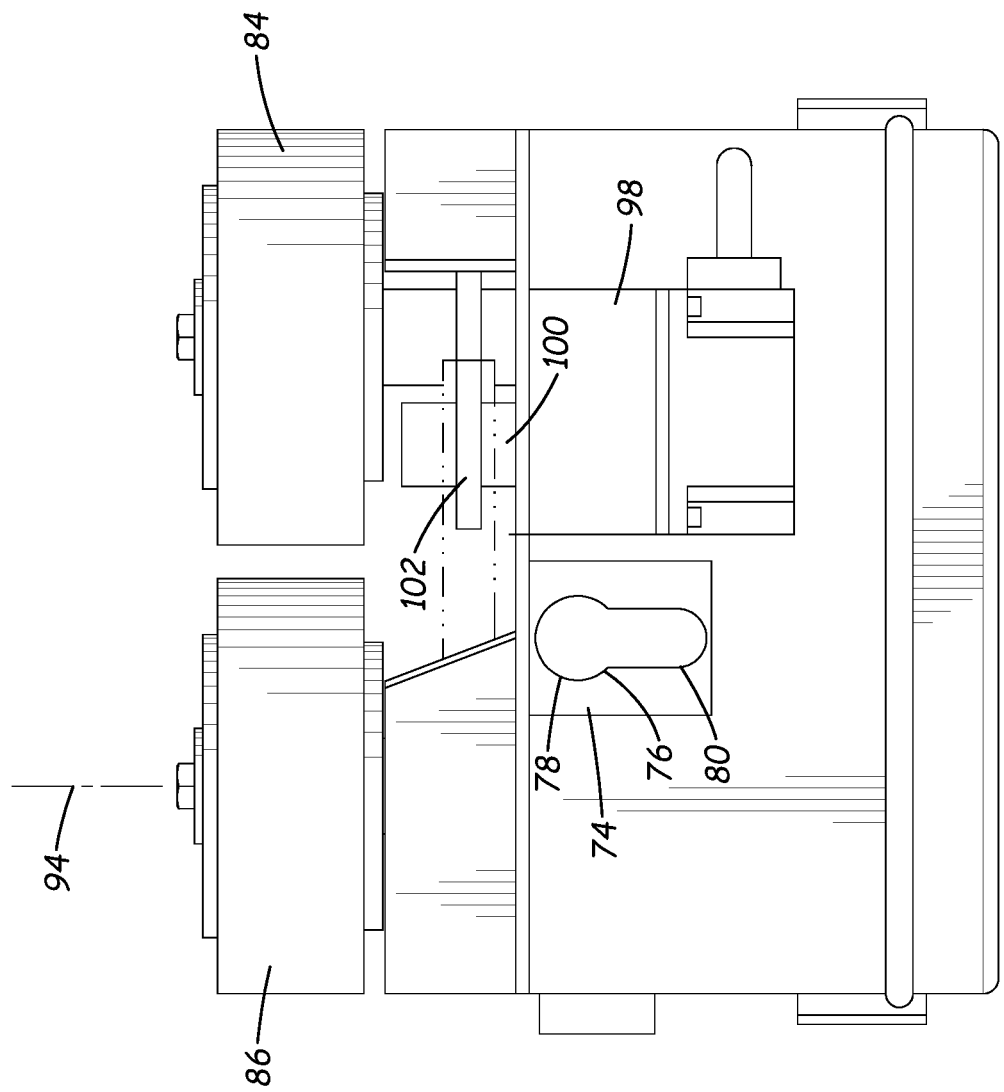
FIG. 6 is a schematic first end view of the mobile spray assembly particularly showing aspects of the movement mechanism and the securing collar element, according to an illustrative embodiment.
Figure 7:
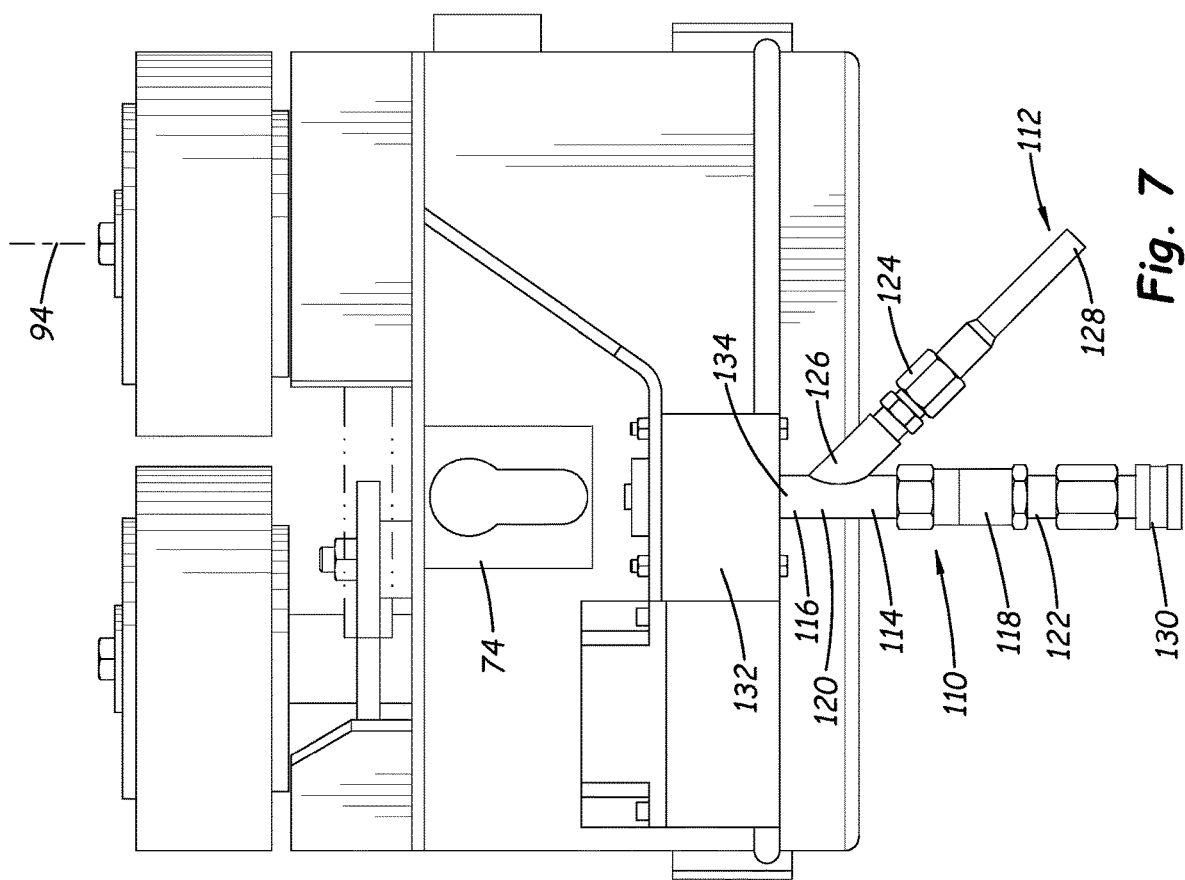
FIG. 7 is a schematic second end view of the mobile spray assembly to clearly showing aspects of the nozzle mechanism, according to an illustrative embodiment.
Figure 8:
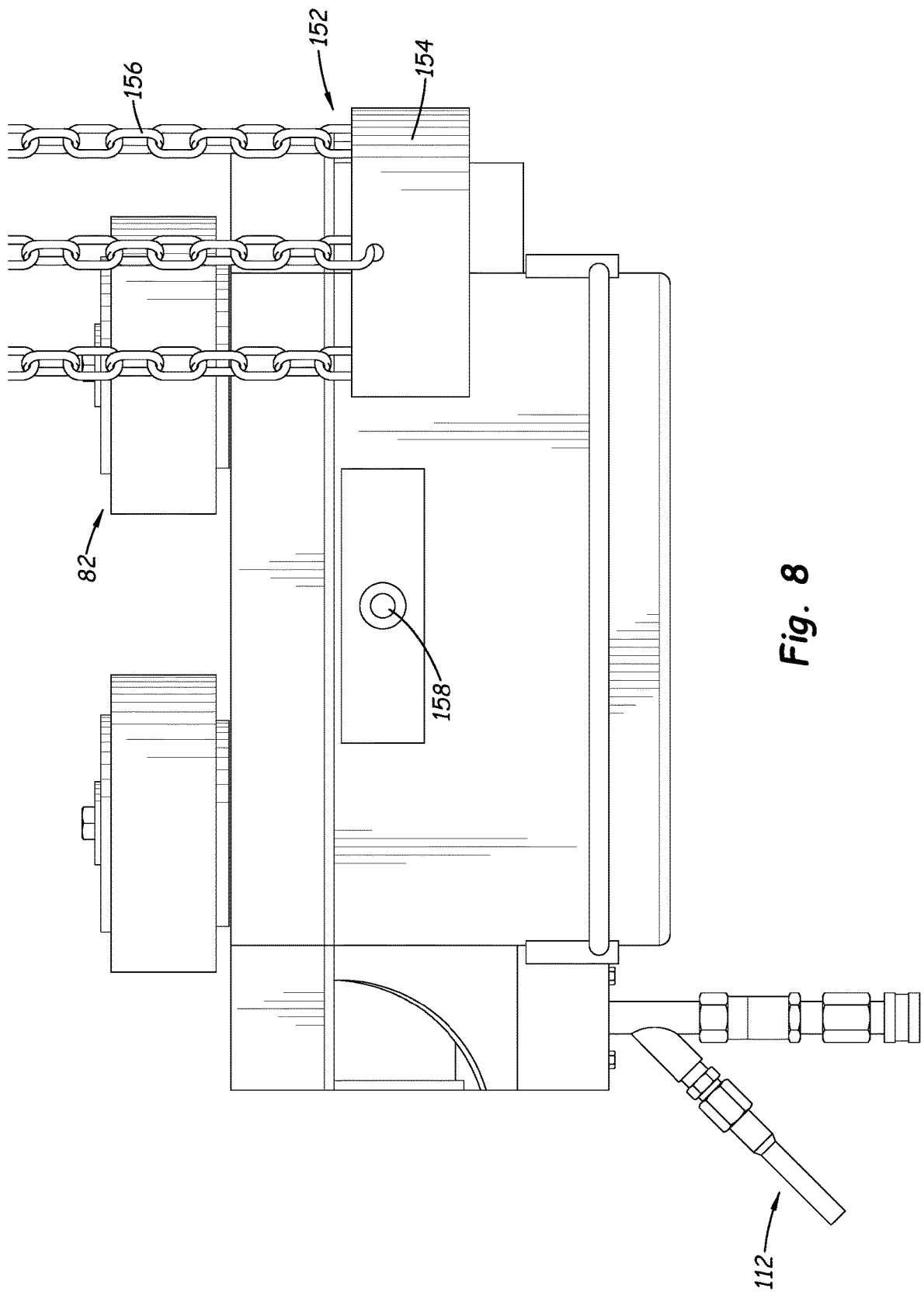
FIG. 8 is a schematic side view of the mobile spray assembly particularly showing aspects of the movement modification structure, according to an illustrative embodiment.

With reference now to the drawings, and in particular to FIGS. 1 through 10 thereof, a new self-propelled overhead livestock enclosure washing system embodying the principles and concepts of the disclosed subject matter will be described.

The applicant has recognized that existing apparatus for washing and cleaning livestock enclosures or pens, particularly those located in the interior of the building, are highly useful but have some aspects which could use improvement. For example, known systems rely upon mechanisms located on the floor of the building to cause a suspended spraying mechanism to move along a path above the pens, which may not always be feasible in some pen configurations.

Further, known systems may be most efficiently utilized in automated movement of the suspended spraying apparatus in one movement direction on the path, but of limited or little use in causing the suspended spraying mechanism to move in the opposite direction along the path, since the spraying mechanism is pulled along a track by a flexible hose, and thus is not able to be "pushed" in the opposite direction. Thus, the known systems rely upon manual movement of the spraying apparatus in the opposite direction to reset the apparatus for further cleaning.

The applicant has recognized that there is a need for an apparatus for cleaning a livestock enclosure that is capable of self-propelling or moving itself along a guide track without, for example, relying upon floor-based elements and while, for example, permitting powered travel in more than one direction along the guide track.

In some aspects, the disclosure relates to a system 1 for washing and cleaning livestock enclosures or pens occupying at least a portion of an interior space 2 of a livestock confinement building 3. The confinement building 3 has a floor 4 which may be solid and continuous or perforated, and in any configuration is subject to being at least partially covered by animal waste and other debris. The building 3 may also have a ceiling 5 elevated above the floor, and may include suitable supporting structure such as beams or trusses. The pens may be formed by a plurality of dividers subdividing the interior space 2, and illustratively the dividers may be formed of bars or other structures that permit some degree of movement of air and water between the hands.

In some implementations of the disclosure, the system 1 may include a cleaning fluid source 10 which is configured to pressurize a cleaning fluid 12 for being sprayed by the system for cleaning. Illustratively, the cleaning fluid source may include a pump 14 for pressurizing the cleaning fluid and a tank 16 for holding a quantity of the cleaning fluid which is in communication with the pump such that the tank provides a supply of the cleaning fluid to the pump for pumping and pressurization. The cleaning fluid itself me take various forms, ranging from substantially pure water to water with cleaning additives. Optionally, the fluid source 10 may also include an apparatus for heating the cleaning fluid via electrical resistance or the combustion of a fuel, for example.

The system 1 may further include a fluid supply assembly 20 which is configured to carry the cleaning fluid away from the fluid source 10 to other elements of the system 1, and the pump 14 may dispense the pressurized cleaning fluid into the supply assembly 20. The fluid supply assembly 20 may form a fluid path 22 from the cleaning fluid source 10. The fluid supply assembly 20 may comprise a supply conduit 24 for conducting the cleaning fluid. In illustrative embodiments of the system 1, the supply conduit 24 may comprise two (or more) conduit segments 26, 28, which may include an upstream segment 26 forming an upstream portion of the fluid path 22 and a downstream segment 28 forming a downstream portion of the fluid path. The conduit segments may additionally include an intermediate segment 30 which may fluidly link the upstream 26 and downstream 28 segments. Optionally, the length of the upstream segment 26 may be substantially equal to the length of the downstream segment 28, but variation in the links may also be utilized. Illustratively, the supply conduit 24 may comprise a flexible hose to permit the elements of the system 1 receiving the cleaning fluid 12 to move about the livestock confinement building while the cleaning fluid source 10 remains relatively stationary.

The fluid supply assembly 20 may further include at least one conduit support spool 32 on which at least a portion of the supply conduit 24 is wound or wrapped. Embodiments of the system 1 may include a pair of conduit support spools 32, 34, and may have an upstream conduit support spool 32 about which the upstream segment 26 of the supply conduit is wound and a downstream conduit support spool 34 about which the downstream segment 28 is wound. Illustratively the spools 32, 34 are rotatable about substantially parallel axes, although other orientations may be utilized.

The fluid supply assembly 20 may also include a mobile conduit support platform 36 which is configured to carry one or more of the conduit support spools. The conduit support spool or spools 32, 34 may be rotatably mounted on the conduit support platform 36, and illustratively both are rotatably mounted on the platform and may be rotatable about substantially parallel axes, although other orientations may be utilized. The conduit support spools 32, 34 may be rotatable with respect to the platform and independently of each other. The mobile conduit support platform 36 may have two orientations, and those two orientations may include a transport orientation and a use orientation.

Illustrative embodiments of the mobile conduit support platform 36 include a platform frame 38 on which the conduit support spools 32, 34 are mounted. The platform frame 38 may extend substantially in a primary plane which may be substantially vertically oriented in the transport orientation of the conduit support platform, and may be substantially horizontally oriented in the use orientation of the platform 36. The platform frame 38 may be elongated in shape and have a first end 40 and a second end 42. In the transport orientation of the platform 36, the second end 42 of the frame may be located above, and may be directly above, the first end 40 of the platform, and the primary plane of the frame 38 may be oriented substantially perpendicular to the ground surface on which the platform rests. In the use orientation of the platform 36, the first end 40 and the second end 42 may be at substantially the same vertical level, and the primary plane of the frame 38 may be oriented substantially parallel to the ground surface on which the platform rests.

Further, embodiments of the mobile conduit support platform 36 may comprise at least one wheel 44 which is rotatably mounted on the platform frame 38 to support at least a portion of the frame on the ground surface. The wheel 44 may be located toward one of the ends 40, 42 of the platform frame, such as the first end 40. Illustratively, a pair of the wheels may be mounted on the frame 38, and may be laterally spaced with respect to each other on one end of the frame.

The mobile conduit support platform 38 may further include a skid 48 on the platform frame 38 for resting on the ground surface. The skid 48 may extend in a downward direction from the primary plane when the conduit support platform is in the use orientation and the wheel or wheels are rested on the ground surface such that the platform frame is supported by the skid 48 and the wheels on the ground surface. The skid 48 may be located on the second end 42 of the platform frame, generally opposite of the wheel or wheels on the first end 40. The mobile conduit support platform 36 may further include a support element 50 which is configured to be positioned against the ground surface when the conduit support platform is in the transport orientation, and provides stability to the platform 36 when the platform is in the transport orientation. The support element 50 may be located at the first end 40 of the platform frame, and may extend substantially perpendicular to the primary plane.

In embodiments, the system 1 may include a guide track assembly 52 for positioning in an elevated condition above the floor 4 of the livestock confinement building. In illustrative embodiments, the guide track assembly 52 may be suspended above the floor 4 from suitable structure of the building, such as beams or trusses utilized to support the ceiling. In other embodiments, the guide track assembly 52 may be supported on posts supported on and extending upwardly from the floor 4. The guide track assembly 20 may define a path 54 extending between two horizontally spaced locations in the interior space 2. In some implementations, the path 54 of the guide track assembly may have at least one end 56, and in some implementations may have a pair of opposite ends 56, 58. Optionally, the path 54 of the track assembly 52 may have a closed configuration with no end.

The guide track assembly 52 may include at least one track segment 60, and may include a plurality of the track segment. The track assembly 20 may include at least one end portion or segment 64 positioned at the end 56 of the path 54 of the guide track assembly, and may have a pair of the end portions or segments 64. Each of the track segments 60 may be elongated. Illustratively, each of the track segments 60 may have a configuration with an inverted T-shaped in cross-section. Illustratively, the T-shaped cross-section may have a web portion 66 for orienting in a substantially vertical plane and a flange portion 68 for orienting in a substantially horizontal plane. The web portion 66 may be united to the flange portion 68 at a substantially medial location on the flange portion such that a section of the flange portion is located on each side of the web portion.

The track assembly 52 may further include a stop element 69 for indicating one of the ends 56 of the path of the guide track assembly 52, and the stop element may be configured to block further movement along the guide track assembly of an element traversing the guide track assembly. The stop element 69 may be positioned adjacent to the respective end, such as in line with the extent of the end segment of the track. In some embodiments, a pair of the stop elements 69 may be utilized, and each stop element may be positioned adjacent to one of the ends 56, 58 of the guide track assembly. The stop element 69 may extend about a portion of the end segment 64 of the track assembly to produce a physical barrier from movement along the track past the element 69.

The system 1 may further include a mobile spray assembly 70 configured to engage the guide track assembly 52, such as via one or more of the track segments, to support the spray assembly 70 and to guide movement of the spray assembly so that the assembly 70 is able to be selectively advanced or moved along the track assembly. The mobile spray assembly 70 is suitably fluidly connectable to, or in fluid communication with, the cleaning fluid source 10 so that the assembly 70 receives cleaning fluid from the source 10 for spraying the cleaning fluid into the interior space 2 of the livestock confinement building to clean the interior space 2 of the confinement building while the mobile spray assembly advances along the guide track assembly 52.

In illustrative embodiments, the mobile spray assembly 70 may comprise a mobile frame 72 for supporting the various elements of the assembly 70. In illustrative embodiments, the mobile frame 72 may include a securing collar element 74 which is configured to secure a portion of the fluid supply conduit 24 to the mobile frame such that movement of the mobile frame causes movement of the supply conduit, such as by pulling the conduit 24 along as the assembly 70 moves along the guide track assembly 52, which can be useful for pulling a portion of the supply conduit 24 across the interior space of the building from the supply assembly 20, such as from one of the conduit support spools. In use, the fluid supply assembly 20 may be positioned in a central location of the interior space 2, and the end of one of the conduit segments may be drawn to the cleaning fluid source which may be located toward one end of the track assembly by movement of the mobile spray assembly 70 (see FIG. 1). The end of the conduit segment may be connected to the fluid supply assembly to initiate operation of the system. The collar element 74 may be positioned on the mobile frame 72 at a location that is adjacent to, and may be directly below, a track segment 64 on which the spray assembly 70 is suspended. In illustrative embodiments, a securing collar element 74 is located at opposite ends of the mobile frame 72. The securing collar element 74 may have an opening 76 for receiving a portion of the supply conduit 24, and the opening may have a first section 78 with a relatively larger width and a second section 80 with a relatively smaller width relative to the width of the first section. Further, the width of the first section 78 may be sized to permit a connection fitting on the supply conduit to pass through the first section of the opening and the width of the second section 78 may be sized to block passage of the connection fitting through the second section of the opening. As a result, the connection fitting on the conduit may be passed through the first section 78 of the opening and may be withdrawn through the first section, but cannot be withdrawn through the second section 80 of the opening. Further, the second section 80 of the opening may be positioned lower than the first section 78 such that gravity acting on the supply conduit tends to move the supply conduit towards the second section, and toward a relationship in which the connection fitting on the conduit is not removable through the opening.

The mobile spray assembly 70 may further include a movement mechanism 82 configured to move the mobile spray assembly 70 along the guide track assembly 52. The movement mechanism 82 may comprise a pair of movement wheels 84, 86 which are rotatably mounted on the frame 72, and the wheels may be positioned or positionable on opposite sides of the track segments 60 of the guide track assembly 52. The wheels 84, 86 may be positioned on opposite horizontal sides of the track segments such that a horizontal plane may intersect the wheels and the track segment at the same time. Illustratively, the pair of movement wheels 84, 86 may engage the flange portion 68 of a track segment 60, and may each rest upon one of the sections of the flange portion located on opposite sides of the web portion 66, so that the guide track assembly provides support to the spray assembly 70 in a vertical direction. Further, the pair of movement wheels 84, 86 may engage the web portion 66 of a track segment in a manner such that rotation of at least one of the movement wheels causes the mobile spray assembly 70 to move along the path of the track assembly. Additionally, the resting of the wheels 84, 86 on the sections of the flange portion may also contribute to the ability of the wheels to move the spray assembly along the track segment. In the illustrative embodiments, a second pair of movement wheels 88, 90 may be rotatably mounted on the frame 72 with the movement wheels of the second pair being positioned on opposite sides of the track segment to provide additional engagement with the track segment for the purposes of movement and/or vertical support. The second pair of movement wheels 88, 90 may be positioned on the mobile frame 72 such that a track segment is able to extend through the gap between the first pair of movement wheels 84, 86 and the gap between the second pair of movement wheels 88, 90 at the same time.

Each of the movement wheels 84, 86, 88, 90 may be mounted on a respective rotation shaft 92 which is mounted on the frame 72, such that each of the movement wheels 84, 86, 88, 90 may be rotatable about a respective rotation axis 94. Illustratively, wheels may be rotatably mounted on the shaft 92 to permit rotation of the wheels, or the shaft 92 may be rotatably mounted on the frame 72 to permit rotation of the wheels. Each of the movement wheels may have a driven pulley or sprocket 96 mounted on the associated rotation shaft 92 (or optionally directly to the associated wheel) for driving rotation of the shaft and/or the associated wheel. The respective rotation axes 94 of the movement wheels may be substantially vertically oriented when the mobile spray assembly 70 is mounted on the track assembly 52 for operation. The rotation axes of the movement wheels may thus be oriented substantially parallel to the vertically-oriented web portion 66 of the track segments 60, which may facilitate keeping the wheels in contact with the track segment, particularly in areas where the track curves in a horizontal plane oriented parallel to the floor 4 of the building.

The movement mechanism 82 may comprise a movement motor 98 which is configured to rotate at least one of the movement wheels, and in some implementations two or more or all of the wheels. The movement motor 98 may be mounted on the frame 72. The motor 98 has a motor shaft 100 and may have a driver pulley or sprocket 102 mounted on the motor shaft. The movement mechanism 82 may also include n endless movement member, such as a movement chain 104, which may be engaged with the driver sprocket 102 and the driven sprockets 96 to transfer rotation of the driver sprocket to the driven sprockets and thereby cause the movement wheels to rotate and move the mobile spray assembly along the track assembly. The movement mechanism 40 may also include an idler pulley or sprocket 106 mounted on the frame 72 for rotation, and the idler sprocket may be engaged by the movement chain 104 and positioned in a manner such that the idler sprocket increases the degree of engagement of the movement chain 104 with the driven sprockets associated with the movement wheels.

In some implementations of the system 1, the movement mechanism 82 may further include a stop sensing device which is configured to sense positioning of the mobile spray assembly 70 adjacent to an end 40,42 of the path 54. The stop sensing device may sense the stop element 30 of the guide track assembly, and may sense the element via contact between the stop sensing device and the stop element 69. Illustratively, the stop sensing device may comprise a button extending from the frame 72 of the mobile spray assembly and the button may be movable by contact of the button with the stop element 69. The stop sensing device may also comprise a switch which is able to be actuated by movement of the button. Actuation of the switch may cause the movement motor 98 to change the rotational direction of the shaft 94, to thereby change the direction of movement of the mobile spray assembly 70 along the path of the track assembly. In other implementations, actuation of the switch may stop power from being supplied to the movement motor 98 stop movement of the mobile spray assembly. Optionally, a movement direction switch 108 may be provided for manual control of the direction of movement of the spray assembly 70 during operation.

The mobile spray assembly 70 may further include a nozzle mechanism 110 configured to disperse the cleaning fluid from the mobile spray assembly 70 into the interior space 2 of the confinement building. The nozzle mechanism 110 may include a nozzle 112 to dispense the cleaning fluid 12 into the interior space, and may be in fluid communication with the supply conduit 24. Elements of the nozzle mechanism 110 may be rotatable with respect to the mobile frame 72 to direct the end of the nozzle, and the cleaning fluid dispensed therefrom, around the interior space 2 of the confinement building to disperse the cleaning fluid about areas of the space that are not directly below the spray assembly 70.

The nozzle mechanism 110 may include a rotatable structure 114 which is rotatable with respect to the mobile frame 72 of the spray assembly 70. In greater detail, the rotatable structure 114 may have a base 116, and a primary conduit portion 118 mounted on the base to move with the base. When positioned for use, the primary conduit portion 118 may extend along a substantially vertical axis and may be elongated in a substantially vertical direction with an upper end 120 and a lower end 122. The rotatable structure 114 may include a nozzle conduit portion 124 that has the nozzle 112 for dispensing fluid into the interior space 2. The nozzle conduit portion 124 may be in communication with the primary conduit portion 118, and may be integrated with the primary conduit portion such that the nozzle conduit portion 124 and the primary conduit portion rotate as a unit. The nozzle conduit portion may have an inner end 126 and an outer end 128. The cleaning fluid 12 may be dispensed from the nozzle 112 at the outer end 128 during operation of the mobile spray assembly 70. The nozzle conduit portion 124 may extend outwardly with respect to the primary conduit portion, and may extend downwardly with respect to the primary conduit portion. The nozzle conduit portion 124 may be elongated along a longitudinal axis which may be oriented at an angle to a vertical axis. In illustrative embodiments, the angle may measure in the range of approximately 30 degrees to approximately 60 degrees.

The rotatable structure 114 may include a coupler conduit portion 130 which is configured to connect to the supply conduit 24, and may be positioned on the lower end 122 of the primary conduit portion 118 such that a coupled supply conduit hangs downwardly from the coupler conduit portion. Illustratively, the coupler conduit portion 130 may include a quick connect structure. In some implementations, a portion of the supply conduit 24 may extend or hang downwardly from the coupler conduit portion 130 and a further portion of the conduit 24 may extend upwardly to the securing collar element 74 to reduce horizontal forces being applied to the rotatable structure 114 by the conduit 24 during operation and movement of the spray assembly 70.

The nozzle mechanism 110 may further comprise a nozzle rotation motor 132 which is configured to rotate the rotatable structure 114 of the nozzle mechanism with respect to the mobile frame 72 on which the nozzle rotation motor 132 is mounted. The nozzle rotation motor 32 has a rotating shaft 134, and the motor 132 may be positioned such that the rotating shaft rotates about a substantially vertical axis. The rotatable structure 114 may be mounted on the rotating shaft 134 of the motor 132 such that the motor rotates the structure 114, and the base 116 of the rotatable structure may be fixedly mounted on the end of the rotating shaft.

The system 1 may also include a controller 136 for the mobile spray assembly 70 that may be in communication with elements of the assembly 70. The controller 136 may be configured to control the supply of electrical power to the motors of the spray assembly 70. The controller 136 may include a movement control assembly 138 which is configured to control movement of the mobile spray assembly 70 along the guide track assembly 52, and the assembly 138 may control the supply of power to the movement motor 98. The movement control assembly 138 may include a movement power switch 140 for selectively supplying power to the movement motor to initiate or stop movement of the mobile spray assembly 70 on the track assembly. The movement control assembly 138 may also include a movement speed control 142 for controlling a characteristic of the electrical power supplied to the movement motor 98 to thereby control the speed of movement of the mobile spray assembly 70 along the guide track assembly.

The controller 136 may further include a nozzle rotation control assembly 144 which is configured to control rotation of the nozzle 112 of the nozzle mechanism with respect to the mobile frame 72 of the spray assembly. The nozzle rotation control assembly 144 may be configured to control the supply of power to the nozzle rotation motor 132. The nozzle rotation control assembly 144 may include a nozzle rotation switch 146 for selectively supplying power to the nozzle rotation motor to initiate or stop rotational movement of the rotational structure. The nozzle rotation control assembly 114 may include a nozzle rotation speed control 148 for controlling a characteristic of the electrical power supplied to the nozzle rotation motor 132 to thereby control the speed of rotation of the nozzle 112.

The system 1 may also encompass a power supply 150 configured to supply power to elements of the mobile spray assembly 70, and may be connected to the movement motor 98 via the movement control assembly 138, and the power supply may be connected to the nozzle rotation motor 132 via the nozzle rotation control assembly 144.

In embodiments, the mobile spray assembly 70 may include a movement modification structure 152 which is positionable adjacent to, and for example alongside, the path 54 of the guide track assembly 52 at a modification location where it is desired or intended to cause a modification of the movement of the mobile spray assembly 70. The modification of the movement may comprise, as illustrative examples, a reversal of movement of the mobile spray assembly 70 at the modification location or a stoppage of movement of the assembly 70 at the modification location. The reversing beacon structure 152 may be configured to permit movement of the modification location along the path 54 of the guide track assembly. The movement modification structure 152 may include a beacon element 154 positionable alongside one of the track segments 60 of the guide track assembly at the modification location, or the location of the desired modification of movement of the spray assembly 70. Illustratively, the beacon element 154 may comprise a tubular element with rounded surfaces which may advantageously permit easy movement of at least a portion of the assembly 70 by the beacon element. The movement modification structure 152 may also include a beacon support 156 configured to support the beacon element 154 at the modification location. In some embodiments, the beacon support 156 may be configured to suspend the beacon element 154 from a location above the guide track assembly 52, such as, for example the ceiling 5 of the livestock confinement building, to keep the floor and pens of the facility clear of obstructions and reduce the chance of the position of the movement modification structure being unintentionally altered. Illustratively, the beacon support may comprise a flexible element such as a chain or multiple chains, although other types of elements may also be utilized. The movement modification structure 152 may further include a sensor 158 which is suitably located on the mobile spray assembly 70 so that the sensor is brought into proximity to the beacon element 154 when the assembly 70 approaches the movement modification location while moving along the guide track assembly. The sensor 158 may sense the proximity of the beacon element 154 to the spray assembly 70 and signal movement controlling elements to, for example, cause a reversal of direction of movement of the assembly 70 or cause a stoppage of movement of the assembly.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. An enclosure washing system for cleaning portions of an interior space of a livestock confinement building, the enclosure washing system comprising:
    a guide track assembly for positioning in an elevated condition above a floor of the livestock confinement building, the guide track assembly defining a path;
    a mobile spray assembly engaging the guide track assembly such that the mobile spray assembly is suspended on and movable along the guide track assembly along the path, the mobile spray assembly comprising:
    a frame;
    a movement mechanism mounted on the frame and configured to move the spray assembly along the guide track assembly, the movement mechanism comprising:
    a pair of movement wheels rotatably mounted on the frame and positioned to engage the track assembly such that rotation of at least one of the movement wheels causes the mobile spray assembly to move along the guide track assembly; and a movement motor configured to rotate at least one movement wheel of the pair of movement wheels, the movement motor being mounted on the frame; and a nozzle mechanism configured to disperse the a cleaning fluid from the mobile spray assembly into the interior space of the livestock confinement building, the nozzle mechanism including:

a coupler conduit configured to removably connect to a fluid supply conduit of a fluid supply assembly to receive the cleaning fluid from the fluid supply assembly, the coupler conduit extending downwardly with respect to the frame along a substantially vertical rotation axis;

a nozzle in communication with the coupler conduit to receive from the coupler conduit the cleaning fluid received from the coupler conduit from the fluid supply conduit and dispense the cleaning fluid into the interior space, the nozzle extending downwardly with respect to the frame and being oriented at an acute angle to the rotation axis of the coupler conduit to direct the cleaning fluid downwardly and outwardly away from the rotation axis; and wherein the nozzle and the coupler conduit of the nozzle mechanism are rotatable as a unit about the rotation axis to direct the cleaning fluid outwardly from the rotation axis and around the interior space of the livestock confinement building.

2. The system of claim 1 wherein the pair of movement wheels are mounted on the frame of the mobile spray assembly such that the wheels rotate about respective axes which are substantially vertically-oriented when the mobile spray assembly is oriented for use.

3. The system of claim 1 wherein the guide track assembly includes at least one track segment with substantially horizontally oriented surfaces on opposite sides of the track segment when the track segment is positioned for use; and wherein the pair of movement wheels are configured to supportively rest upon the substantially horizontally oriented surfaces of the track segment when the mobile spray assembly is supported on the guide track assembly.

4. The system of claim 3 wherein the at least one track segment of the guide track assembly includes substantially vertically-oriented surfaces on opposite sides of the track segment when the track segment is positioned for use; and wherein the pair of movement wheels engage the substantially vertically-oriented surfaces on the opposite sides of the track segment when the mobile spray assembly is supported on the guide track assembly.

5. The system of claim 1 wherein the movement mechanism includes a second pair of movement wheels rotatably mounted on the frame with the movement wheels of the second pair being positioned on opposite sides of at least one track segment of the guide track assembly.

6. The system of claim 1 wherein the movement mechanism of the mobile spray assembly comprises:

a motor mounted on the frame of the mobile spray assembly; and an endless movement member configured to transfer rotational motion from the motor to at least one movement wheel of the pair of movement wheels.

7. The system of claim 6 wherein the movement mechanism includes a driver sprocket mounted on the motor such that the motor is configured to rotate the driver sprocket;

a driven sprocket associated with at least one wheel of the pair of movement wheels in a manner such that the driven sprocket rotates as a unit with the at least one wheel; and wherein the endless movement member comprises a movement chain entrained on the driver sprocket and the driven sprocket to transfer rotational motion from the driver sprocket to the driven sprocket.

8. An enclosure washing system for cleaning portions of an interior space of a livestock confinement building, the enclosure washing system comprising:

a guide track assembly for positioning in an elevated condition above a floor of the livestock confinement building, the guide track assembly defining a path;

a mobile spray assembly engaging the guide track assembly such that the mobile spray assembly is suspended and supported in an elevated position above the floor of the livestock confinement building and is movable along the guide track assembly along the path, the mobile spray assembly comprising:

a frame;

a movement mechanism mounted on the frame and configured to move the spray assembly along the guide track assembly, the movement mechanism comprising:

a pair of movement wheels rotatably mounted on the frame and positioned to engage the track assembly such that rotation of at least one of the movement wheels causes the mobile spray assembly to move along the guide track assembly;

a movement motor configured to rotate at least one movement wheel of the pair of movement wheels, the movement motor being mounted on the frame;

a nozzle mechanism configured to disperse a cleaning fluid from the mobile spray assembly into the interior space of the livestock confinement building, the nozzle mechanism including a nozzle to dispense the cleaning fluid into the interior space; and a fluid supply assembly configured to provide cleaning fluid to the mobile spray assembly, the fluid supply assembly forming a fluid path from the cleaning fluid source, the fluid supply assembly being supportable on the floor of the livestock confinement assembly below the elevated position of the mobile spray assembly, the supply assembly comprising:

a supply conduit for conducting the cleaning fluid from the fluid supply assembly to the mobile spray assembly, the supply conduit having a segment extending from the fluid supply assembly on the floor of the livestock confinement building to the mobile spray assembly in the elevated position above the floor, the segment comprising a flexible hose permitting movement of the mobile spray assembly on the guide track assembly while the fluid supply assembly remains stationary on the floor of the livestock confinement building.

9. The system of claim 8 wherein the supply conduit has two conduit segments including an upstream segment forming an upstream portion of the fluid path and a downstream segment forming a downstream portion of the fluid path; and wherein the fluid supply assembly additionally comprises a pair of conduit support spools including an upstream conduit support spool about which the upstream segment of the supply conduit is wound and a downstream conduit support spool about which the downstream segment of the supply conduit is wound.

10. The system of claim 9 wherein the fluid supply assembly additionally comprises:
   a mobile conduit support platform configured to carry elements of the fluid supply assembly, the upstream conduit support spool and the downstream conduit support spool being mounted on the support platform so that the conduit support spools are rotatable about substantially parallel axes independently of each other, the mobile conduit support platform comprises a platform frame on which the conduit support spools are mounted.

11. The system of claim 10 wherein the mobile conduit support platform has two orientations including a transport orientation and a use orientation.

12. The system of claim 11 wherein the platform frame of the mobile conduit support platform extends substantially in a primary plane, the primary plane being substantially vertically oriented in the transport orientation of the conduit support platform, the primary plane being substantially horizontally oriented in the use orientation of the conduit support platform.

13. The system of claim 11 wherein the platform frame is elongated with a first end and a second end, the second end being located above the first end in the transport orientation of the conduit support platform, the first end and the second end being at substantially a same vertical level in the use orientation of the conduit support platform.

14. The system of claim 10 wherein the mobile conduit support platform of the fluid supply assembly additionally comprises:
   at least one wheel rotatably mounted on the platform frame to support at least a portion of the platform frame on a ground surface when the mobile conduit support platform is in a use orientation; and
   a skid on the platform frame for resting on the ground surface when the mobile conduit support platform is in the use orientation.

15. The system of claim 14 wherein the mobile conduit support platform of the fluid supply assembly additionally comprises:
   a support element on the platform frame and configured to be positioned against the ground surface when the mobile conduit support platform is in the transport orientation.

16. The system of claim 14 wherein the mobile spray assembly comprises a mobile frame having a securing collar element configured to secure a portion of a supply conduit to the mobile frame such that movement of the mobile frame causes movement of the supply conduit.

17. The system of claim 16 wherein the securing collar element has an opening for receiving a portion of the supply conduit, the opening having a first section with a relatively larger width and a second section with a relatively smaller width.

18. The system of claim 1 wherein the nozzle of the nozzle mechanism is angled downwardly and outwardly with respect to the substantially vertical rotation axis at an angle in a range of approximately 30 degrees to approximately 60 degrees.

19. The system of claim 1 wherein the nozzle mechanism includes:
   a rotatable structure rotatable with respect to the frame of the mobile spray assembly, the rotatable structure including the nozzle and the coupler conduit; and
   a nozzle rotation motor configured to rotate the rotatable structure with respect to the frame of the mobile spray assembly.

20. The system of claim 8 wherein the nozzle mechanism further includes:
   a coupler conduit configured to removably connect to a fluid supply conduit of a fluid supply assembly to receive the cleaning fluid from the fluid supply assembly, the coupler conduit extending downwardly with respect to the frame along a substantially vertical rotation axis;
   a nozzle in communication with the coupler conduit to receive from the coupler conduit the cleaning fluid received from by the coupler conduit from the fluid supply conduit and dispense the cleaning fluid into the interior space, the nozzle extending downwardly with respect to the frame and being oriented at an acute angle to the rotation axis of the coupler conduit to direct the cleaning fluid downwardly and outwardly away from the rotation axis; and
   wherein the nozzle and the coupler conduit of the nozzle mechanism are rotatable as a unit about the rotation axis to direct the cleaning fluid outwardly from the rotation axis and around the interior space of the livestock confinement building.

* * * * *